(12) United States Patent
Ruspa

(10) Patent No.: US 6,698,846 B2
(45) Date of Patent: Mar. 2, 2004

(54) VEHICLE HUBCAP, IN PARTICULAR FOR AN INDUSTRIAL VEHICLE

(75) Inventor: Renzo Ruspa, Turin (IT)

(73) Assignee: Ruspa Officine S.p.A. (IT)

( * ) Notice: Subject to any disclaimer, the term of this patent is extended or adjusted under 35 U.S.C. 154(b) by 0 days.

(21) Appl. No.: 10/273,571

(22) Filed: Oct. 15, 2002

(65) Prior Publication Data

US 2003/0090144 A1 May 15, 2003

(30) Foreign Application Priority Data

Oct. 12, 2001 (IT) .......................... TO010192 U

(51) Int. Cl.[7] ................................................. B60B 7/14
(52) U.S. Cl. ................................ 301/108.4; 301/37.371
(58) Field of Search ........................ 301/37.101, 37.102, 301/37.371, 37.372, 37.373, 108.1, 108.4

(56) References Cited

U.S. PATENT DOCUMENTS 3,092,421 A * 6/1963 Lyon
4,639,045 A * 1/1987 Kane ...................... 301/37.371
5,193,884 A * 3/1993 Sheu et al. ............. 301/37.371
5,542,750 A * 8/1996 FitzGerald ............. 301/37.371

* cited by examiner

Primary Examiner—Russell D. Stormer
(74) Attorney, Agent, or Firm—Ostrolenk, Faber, Gerb & Soffen, LLP

(57) ABSTRACT

A hubcap having a circular contoured wall with a number of openings; and at least two connecting members carried by the contoured wall, each at a respective opening, for connecting the hubcap stably to a wheel rim. At each opening fitted with a connecting member, the contoured wall forms two integral facing connecting flanges extending from opposite sides of the opening in a direction crosswise to the contoured wall. Each connecting member is C-shaped and has a central portion and two wings crosswise to the central portion; and each wing is welded stably to a respective connecting flange.

10 Claims, 3 Drawing Sheets

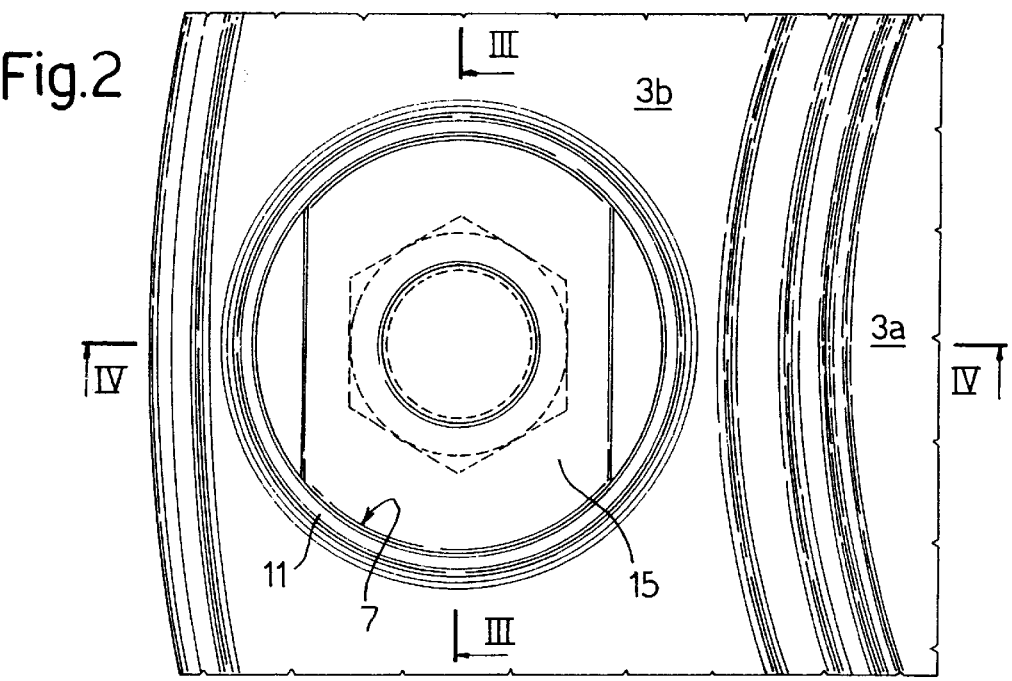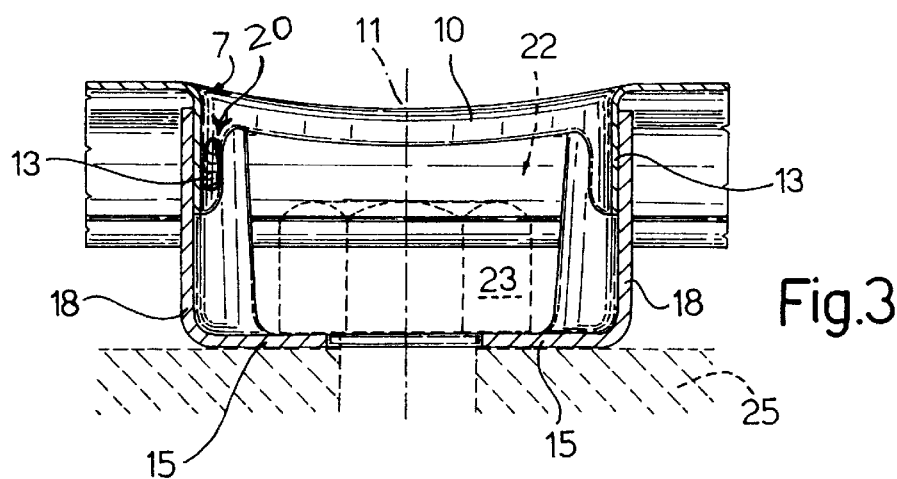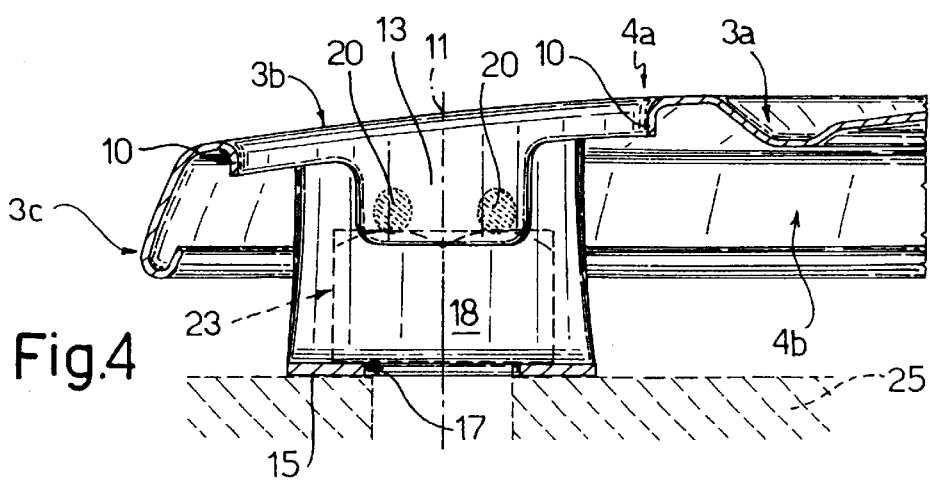

US 6,698,846 B2

VEHICLE HUBCAP, IN PARTICULAR FOR AN INDUSTRIAL VEHICLE

The present invention relates to a vehicle hubcap, in particular for an industrial vehicle.

BACKGROUND OF THE INVENTION

Vehicle, in particular industrial vehicle, hubcaps are known to comprise a circular contoured metal wall having a number of openings; and a number of connecting members carried by the contoured wall, each at a respective opening, for connecting the hubcap stably to the wheel rim.

The connecting members normally comprise brackets spot welded stably to the contoured wall close to the peripheral edges of the openings, so that the weld spots are clearly visible from the outside, thus impairing the appearance of the hubcap.

SUMMARY OF THE INVENTION

It is an object of the present invention to provide a hubcap designed to eliminate the drawbacks of known types.

According to the present invention, there is provided a hubcap for a vehicle, in particular an industrial vehicle, comprising: a circular contoured wall having a number of openings; and at least two connecting members carried by the contoured wall, each at at least one respective opening, for connecting said hubcap stably to a wheel rim; characterized in that, at each opening fitted with a connecting member, the contoured wall forms at least one integral connecting flange extending in a direction crosswise to the contoured wall; each connecting member being C-shaped and comprising a central portion and two wings crosswise to the central portion; and each wing being welded stably to a respective connecting flange.

The welds between the contoured wall and connecting members are therefore not located on a portion of the contoured wall visible from the outside, and in particular are not located close to the peripheral edges of the openings.

The appearance of the hubcap is thus greatly improved.

BRIEF DESCRIPTION OF THE DRAWINGS

A preferred, non-limiting embodiment of the invention will be described by way of example with reference to the accompanying drawings, in which:

FIG. 2 shows a larger-scale view of a portion of the FIG. 1 hubcap;

FIG. 3 shows a section along line III—III in FIG. 2;

FIG. 4 shows a section along line IV—IV in FIG. 2;

DETAILED DESCRIPTION OF THE INVENTION

Figure 1:
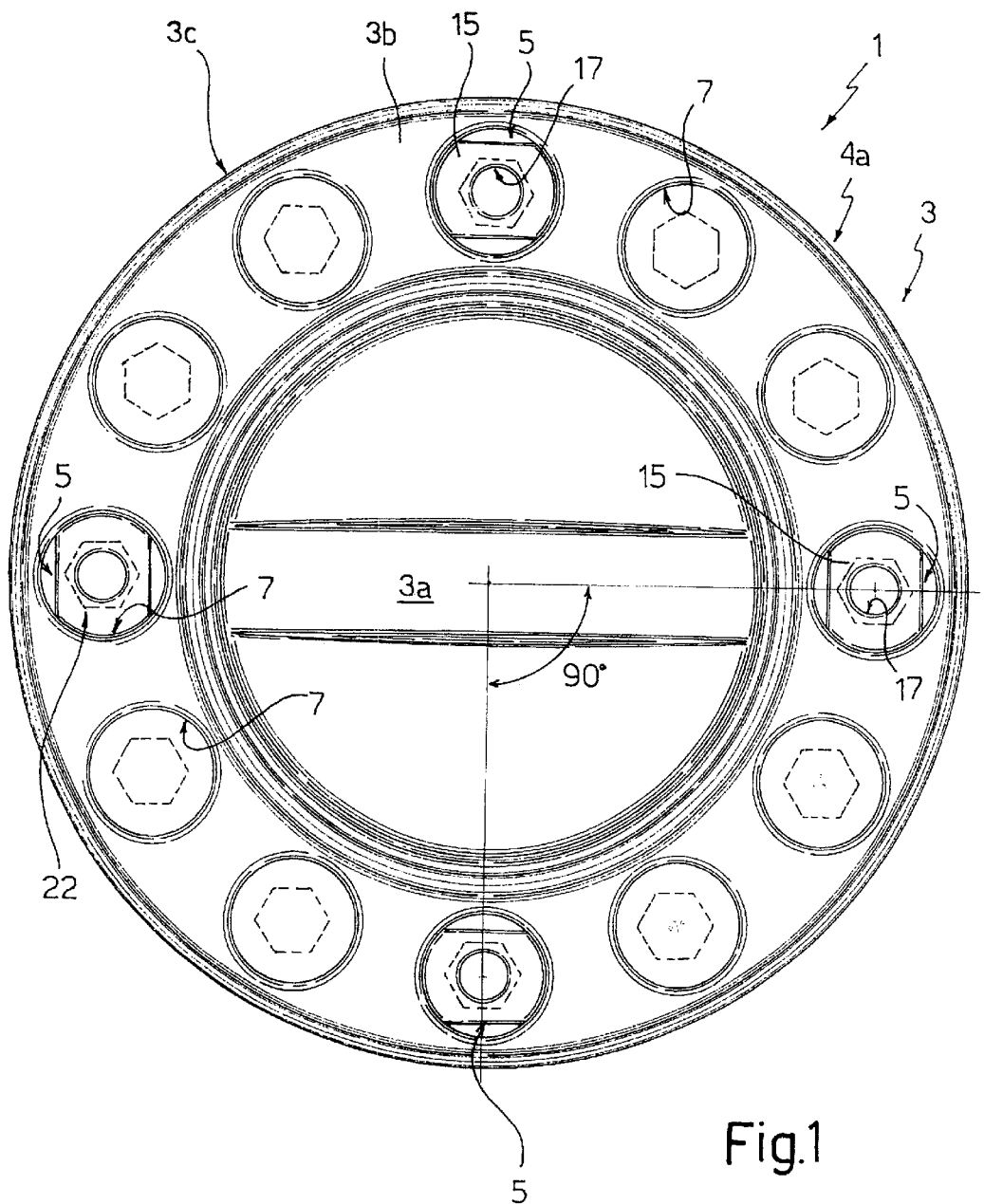
FIG. 1 shows a front view of a hubcap in accordance with the teachings of the present invention.

Number 1 in FIG. 1 indicates as a whole a hubcap for a vehicle, in particular an industrial vehicle, wheel.

Hubcap 1 comprises a circular contoured wall 3; and a number of connecting members 5 carried by contoured wall 3 and for connecting hubcap 1 to a wheel rim (not shown) of a vehicle (not shown).

Contoured wall 3 is preferably made of metal and stamped in one piece, and comprises a circular central portion 3a (FIG. 1); a substantially flat, annular intermediate portion 3b; and a peripheral edge portion 3c bent with respect to intermediate portion 3b to form an annular edge (FIG. 4) of contoured wall 3.

Contoured wall 3 comprises a first face 4a (out face—FIG. 1) facing outwards of the wheel in use; and a second face 4b (FIG. 4) facing the vehicle wheel rim. Face 4a is preferably surface finished (e.g. chromium plated) to enhance its appearance.

Intermediate portion 3b of contoured wall 3 comprises a number of circular openings 7 (twelve in the example shown) equally spaced and of the same diameter.

Openings 7 are formed when stamping contoured wall 3, so that, at each opening 7, intermediate portion 3b is bent towards inner face 4b to form a short tubular member 10 (FIG. 3) integral with intermediate portion 3b and coaxial with an axis 11.

In the first embodiment shown, connecting members 5 are four in number, each located at a respective opening 7. More specifically, the connecting members are located at openings 7 spaced 90° apart, so that the connecting members are located at the corners of a square lying within the circular perimeter defined by circular contoured wall 3.

At each opening fitted with a connecting member 5, tubular member 10 comprises two flanges 13 (FIGS. 3 and 4) extending axially and integrally from edges of tubular member 10, and having a C-shaped cross section. Flanges 13 are located on opposite sides of opening 7 and therefore face each other.

Connecting member 5 comprises a C-shaped bracket, in turn comprising a substantially flat rectangular central portion 15 having a central hole 17; and two wings 18 extending integrally from opposite sides of, and perpendicularly to, central portion 15, and having a C-shaped cross section so as to match the contour of flanges 13. More specifically, end portions of wings 18 are positioned contacting flanges 13, and are connected to flanges 13 by weld spots 20 (FIG. 4). Wings 18 contact flanges 13 on the walls of flanges 13 facing away from opening 7.

In this way, no welds are made on the portion of contoured wall 3 visible from the outside, i.e. portion 3a or 3b, and weld spots 20 are also concealed from the outside.

Hubcap 1 is assembled extremely easily by positioning contoured wall 3 facing the vehicle wheel rim (not shown), and inserting screws 22 (shown by the dash lines) inside holes 17 to connect the wheel rim to the hub (not shown).

More specifically, the head 23 of screw 22 rests on and pushes central portion 15 onto a supporting portion 25 (FIGS. 3 and 4) of the wheel rim, is therefore visible through opening 7, and further conceals weld spots 20.

The wheel rim-hub fastening screws not fitted to connecting members 5 are also visible through respective openings 7.

Clearly, changes may be made to the hubcap as described and illustrated herein without, however, departing from the scope of the present invention.

Figure 5:
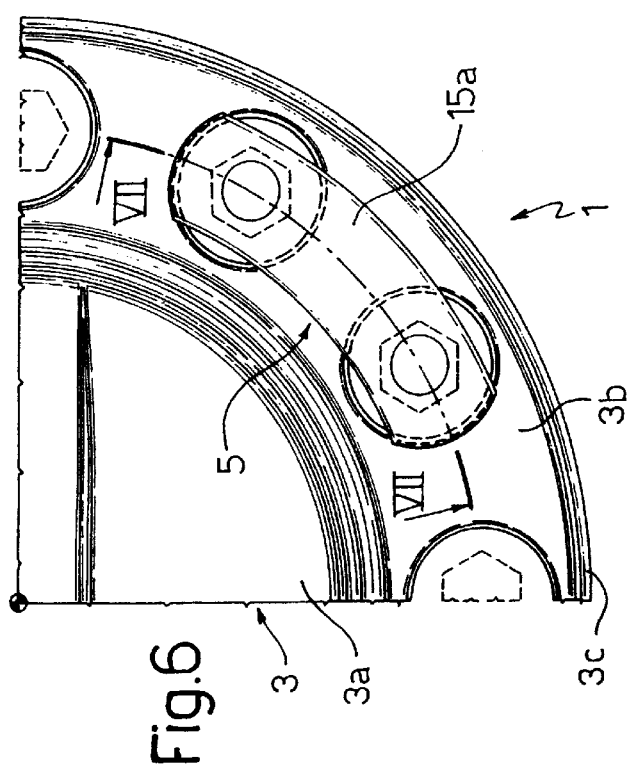
FIG. 5 shows a front view of a portion of a hubcap in accordance with a variation.
Figure 6:
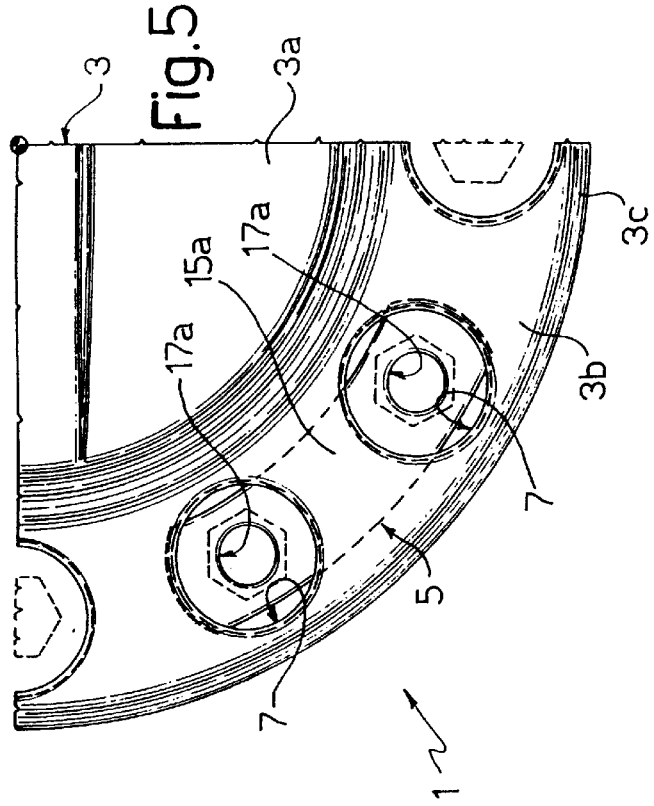
FIG. 6 shows a rear view of the FIG. 5 portion.
Figure 7:
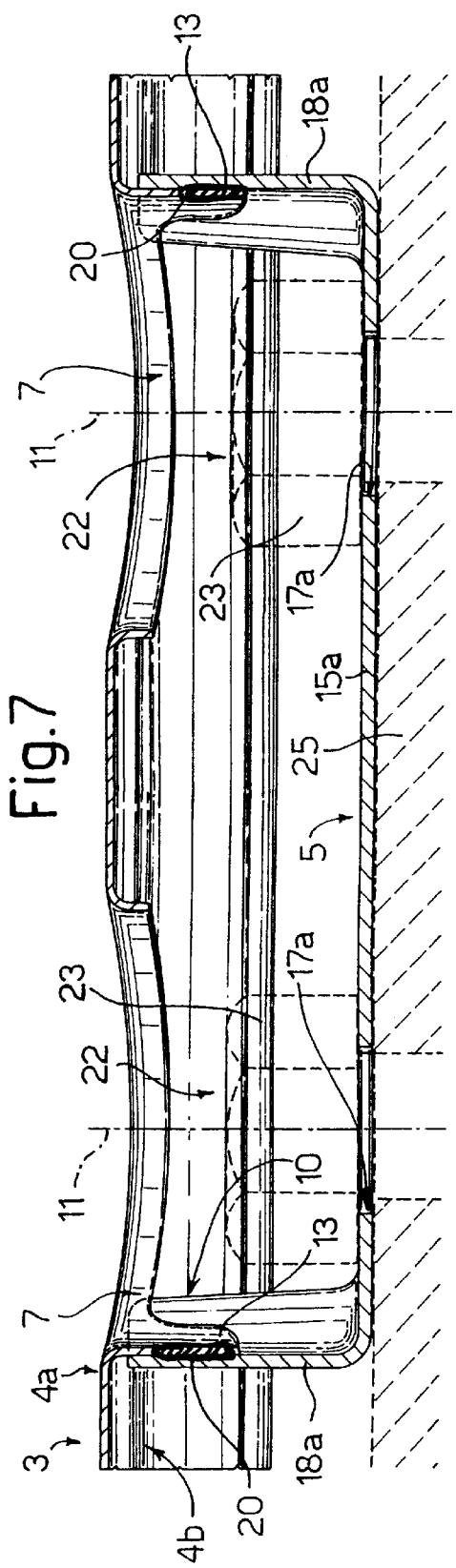
FIG. 7 shows a section of the variation along line VII—VII in FIG. 6.

In the FIGS. 5, 6 and 7 variation, in which any parts identical with those already described are indicated using the same reference numbers, a connecting member 5 is located at two adjacent openings 7.

More specifically, connecting member 5 comprises a C-shaped bracket, in turn comprising an arc-shaped central portion 15a having two spaced holes 17a; and two wings 18a extending integrally from opposite sides of, and perpendicularly to, central portion 15a.

Wings 18a have a C-shaped cross section to match the contour of flanges 13 of different openings 7 (in the example shown, two side by side flanges 13 of adjacent openings 7).

More specifically, end portions of wings 18 are positioned contacting flanges 13 of respective different openings 7, and are connected to flanges 13 by weld spots 20 (FIG. 7).

Each hole 17a is concentric with a respective opening 7 (FIG. 5) to permit insertion of a respective screw 22 (shown by the dash line in FIG. 7) for connecting the wheel rim to the hub (not shown).

More specifically, head 23 of each screw 22 rests on and pushes central portion 15a onto a supporting portion 25 (FIG. 7) of the wheel rim, is therefore visible through opening 7, and further conceals weld spots 20. In the variation shown, each connecting member is fitted with two screws to improve connection of contoured wall 3 to the wheel rim.

What is claimed is:

1. A hubcap (1) for a vehicle, in particular an industrial vehicle, comprising:

a circular contoured wall (3) having a number of openings (7); and at least two connecting members (5) carried by the contoured wall (3), each at at least one respective opening (7), for connecting said hubcap (1) stably to a wheel rim;

characterized in that, at each opening (7) fitted with a connecting member (5), the contoured wall forms at least one integral connecting flange (13) extending in a direction (11) crosswise to the contoured wall (3);

each connecting member (5) being C-shaped and comprising a central portion (15, 15a) and two wings (18) crosswise to the central portion; and each wing (18) being welded (20) stably to a respective connecting flange (13).

2. A hubcap as claimed in claim 1, wherein each connecting member (5) is fitted to a respective opening; each wing (18) being welded (20) stably to a respective connecting flange (13) of the opening.

3. A hubcap as claimed in claim 1, wherein each connecting member (5) is fitted to at least two openings; each wing (18) being welded (20) stably to a respective connecting flange (13) of a respective opening.

4. A hubcap as claimed in claim 1, wherein said openings (7) are circular.

5. A hubcap as claimed in claim 1, wherein said contoured wall (3) comprises a circular central portion (3a); a substantially flat, annular intermediate portion (3b); and a peripheral edge portion (3c) bent with respect to the intermediate portion (3b) to form an edge of said contoured wall (3).

6. A hubcap as claimed in claim 5, wherein said openings (7) are formed in said intermediate portion (3b).

7. A hubcap as claimed in claim 1, wherein said openings (7) are equally spaced angularly.

8. A hubcap as claimed in claim 1, wherein said central portion (15, 15a) of said connecting member (5) has at least one hole (17) for connecting said contoured wall (3) to said wheel rim.

9. A hubcap as claimed in claim 1, wherein said connecting flanges (13) have a C-shaped cross section; said wings (18) having a substantially C-shaped cross section to mate with said flanges.

10. A hubcap as claimed in claim 1, wherein four angularly equally spaced connecting members (5) are provided.

* * * * *